United States Patent [19]

Tombers

[11] 3,967,438
[45] July 6, 1976

[54] ROTARY MOWER SPINDLE ASSEMBLY
[75] Inventor: Michael D. Tombers, Merrillville, Ind.
[73] Assignee: International Harvester Company, Chicago, Ill.
[22] Filed: Apr. 18, 1975
[21] Appl. No.: 569,238

[52] U.S. Cl. ................................. 56/113; 56/17.5; 192/8 R
[51] Int. Cl.² ......................................... A01D 35/26
[58] Field of Search............. 56/11.3, 17.5; 192/8 R, 192/18 R, 147, 15, 16, 64

[56] References Cited
UNITED STATES PATENTS

| | | | |
|---|---|---|---|
| 3,108,669 | 10/1963 | Ateliani.............................. | 192/8 R |
| 3,722,642 | 3/1973 | Zurek.................................. | 192/8 R |

*Primary Examiner*—J.N. Eskovitz
*Attorney, Agent, or Firm*—Dennis K. Sullivan; Floyd B. Harman

[57] ABSTRACT

An improved mower blade spindle assembly for a rotary mower is provided with an outer shaft having circumferential slots and an inner shaft rotatable within the outer shaft and having a diametral drive pin extending through the slots, and a braking member axially movably mounted on the outer shaft for rotation therewith, the braking member having a braking surface disposed for engagement with an interior surface of a support sleeve in which the outer shaft is mounted and a cammed surface disposed for engagement with the pin such that upon cessation of the input drive, the pin acts against the cammed surface to shift the brake member axially to engage the braking surfaces.

12 Claims, 2 Drawing Figures

U.S. Patent  July 6, 1976  3,967,438
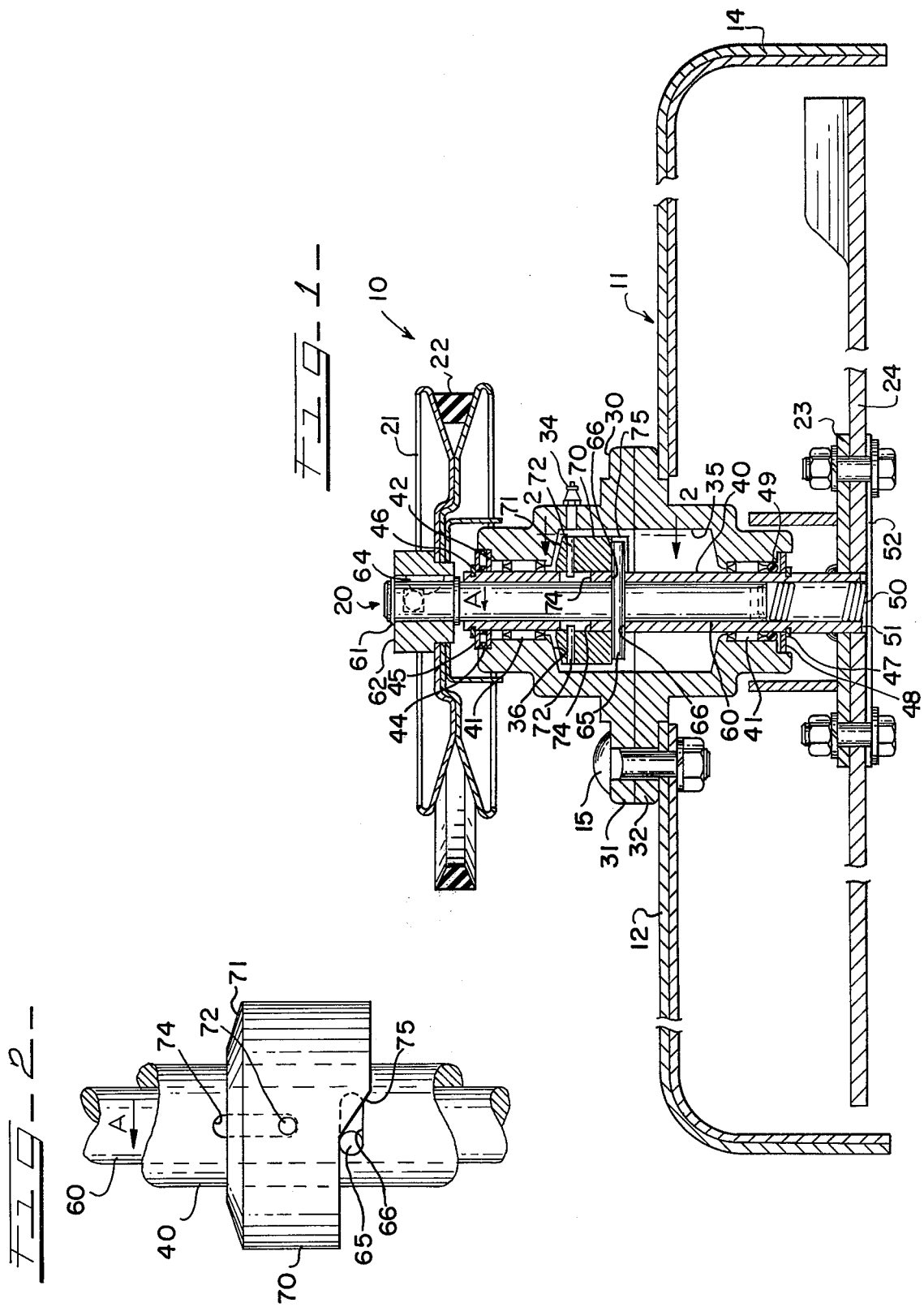

ROTARY MOWER SPINDLE ASSEMBLY

BACKGROUND OF THE INVENTION AND THE PRIOR ART

This invention relates to rotary mowers and more particularly, to a rotary mower having improved spindle means including an automatic braking mechanism for stopping the rotation of the blade when the input power is cut off.

In mowers of the walk behind type, the cutting blade is generally attached directly to the engine mounted thereon. Consequently, when the engine is stopped, the blade stops. Mowers of the type used on garden tractors and riding mowers, however, are generally belt driven from the engine. The belt drive usually is provided with a clutch idler pulley which tensions the drive belt to drive the mower thus permitting the garden tractor or riding mower to be driven without engaging the mower. When the drive is declutched, however, the mower blade acts as a flywheel and may continue to rotate silently for a period of time after the power is shut off, leaving a potential source of injury for the person who may reach within the mower housing after declutching the engine to clear a blockage.

Various people have attacked this problem using audible warning mechanisms, such as an overrunning clutch; however, such devices do not stop the blade and probably extend the period of rotation. Others have developed mechanical braking devices such as the clutch-brake devices described in U.S. Pat. No. 3,837,450 to Malion et al. and U.S. Pat. No. 2,985,992 to Dowdle. These devices require external actuation and means for declutching the drive as well as means for braking, rendering them less useful for tractor mounted mowers.

Still others have developed automatic mower spindle brake mechanisms. U.S. Pat. No. 3,722,642 to Zurek et al. and U.S. Pat. No. 3,731,472 to Kamlukin describe similar mechanisms wherein the input sheave is threaded on the output shaft. Drive through the input sheave rotates it up the threads to a stop producing a driving coupling with the output shaft. When the mower blade overruns the input sheave due to their different inertias, reverse relative rotation occurs between the input sheave and the output shaft and the input sheave rotates downwardly on the output shaft threads to engage complemental braking surfaces on the sheave and spindle support sleeve. While these devices perform their intended function, it is found that the threaded connection between the input sheave and the output shaft tends to make the device more expensive and create wear problems. The wear problems are believed to be caused by the rocking action of the sheave on the shaft threads due to the offset nature of the loading on the input sheave. This rocking action also can cause some vibration and noise in the spindle assembly. Moreover, since the input sheave must be external of the support sleeve, sealing of the unit is difficult and the up and down movement of the sheave on the output shaft tends to pump the lubricant out of the mechanism creating further wear problems.

Accordingly, it is a general object of the invention described herein to produce a rotary mower having a relatively inexpensive blade spindle assembly which may be automatically braked upon cessation of the input drive thereto and which is less subject to wear problems.

It is a more specific object of the invention to provide an improved automatic braking means for a mower spindle assembly wherein the driving force is transferred to the output shaft independently of the braking member.

It is a further object of the invention to provide an improved mower having an automatic braking spindle assembly which is more readily adaptable to being sealed.

SUMMARY OF THE INVENTION

These and other objects of the invention are met in a rotary mower of the type having a housing, a spindle assembly mounted on the housing, an input sheave mounted on the spindle assembly, and a high speed cutting blade mounted on the lower part of the spindle assembly within the mower housing, wherein the spindle assembly comprises a support sleeve having a first braking surface, an outer shaft journalled in the sleeve having a circumferential slot, an inner shaft rotatable to a limited extent within the outer shaft, a radial drive pin mounted in the inner shaft and extending through the circumferential slot in the output shaft, and a brake member axially movably mounted on the outside of the outer shaft for rotation therewith, the brake member having a second braking surface and a cammed surface disposed for engagement with the drive pins such that upon cessation of the drive to the input sheave and the cutting blade producing a relative rotation between the inner and outer shafts, the drive pin moves against the cammed surface to shift the brake member axially to engage the braking surfaces.

BRIEF DESCRIPTION OF THE DRAWINGS

Other objects and advantages of the invention will become apparent upon reading the following detailed description and upon reference to the drawings, in which:

FIG. 1 is a sectional elevation of an improved rotary mower incorporating the novel aspects of applicant's invention; and FIG. 2 is a partial view of the rotating members internal of the support sleeve taken along the line 2—2 of FIG. 1.

DETAILED DESCRIPTION OF THE INVENTION

Turning now to the drawings, there is shown a section of a rotary mower generally designated 10 which may be a single or multiple spindle mower of the type generally known in the art, such as the two spindle mower used on the International Cadet 76 Lawn Tractor made by the International Harvester Company. The mower 10 includes a housing 11 including a horizontal deck portion 12 and vertical side portions 14 which enclose the mower blade for safety.

A vertical spindle assembly generally designated 20 is mounted to the housing deck 12 as by bolt 15. Mounted at the top of the spindle assembly 20 is a pulley or sheave 21 which is adapted to be driven by a belt 22 from an associated source of power such as a tractor engine (not shown), as is customary in the art. Mounted at the bottom of the spindle assembly 20 is a mounting plate 23 to which may be bolted, for ease of replacement, a mower cutting blade 24 of considerably larger inertia than the input sheave 21 which extends parallel to the deck 12 within the housing 11. The mower blade 24 is provided with impact cutting edges at its outer ends and generally is rotated at high speed, for example about 3000 rpm to produce a tip speed of the cutting blade of about 18,000 feet per minute, for good cutting efficiency in grass. It will be appreciated that all of the foregoing description is generally in accordance with the art.

Focusing in greater detail on the novel aspects of our invention, the spindle assembly 20 comprises a support sleeve 30 which, for simplicity of manufacture and to permit an end for end reversal thereof, comprises two substantially identical top and bottom castings 31 and 32, the only difference therebetween being that one may have a lubrication fitting 34 provided thereon. The castings 31 and 32 are provided with mating flanges which fit together to form a mounting flange for the spindle assembly 20 to the housing deck 12. The support sleeve 30 is provided with an internal cylindrical cavity 35, the upper end of the cylindrical cavity being provided with a first frustoconical braking surface 36. An outer output shaft 40 comprising a hollow cylinder or pipe is journalled in the housing 30 by upper and lower roller bearings 41 for high speed rotation. The upper portion of the support sleeve 30 is provided with a shoulder portion 42 which supports a thrust bearing 44 sandwiched in between a pair of thrust washers 45, a snap ring 46 retaining the thrust bearing assembly in position relative to the outer shaft 40. The thrust washers 45 also provide an upper grease seal means for the housing. The lower end of the shaft 40 is provided with a snap ring 47 which retains a washer 48 against an annular step in the lower portion of the support sleeve 30, a grease seal 49 being interposed between the retaining washer 48 and the lower bearing 41. Thus the two snap rings 46 and 47 retain the output shaft against axial play in the support sleeve.

The outer shaft 40 extends downwardly from the support sleeve 30 whereat it is welded to the blade mounting plate 23, a portion of the shaft extending through the mounting plate and blade 24 to be flush therewith. A helical torsion spring 50 of a diameter slightly smaller than the inner diameter of the shaft 40 is inserted at the bottom thereof, the spring 50 having its last coil extended outwardly to engage a notch in the end of the outer shaft 40 as at 51. A cover plate 52 retains the spring 50 in the notch of the output shaft and provides a bottom support therefor. An inner input shaft 60 is mounted for limited rotation within the outer shaft 40 and has a diametral slot at the bottom end which receives the upper coil of the spring 50. The hub 62 of the input sheave 21 is mounted against rotation to the top end of the inner shaft 60 as by key 64, a pair of snap rings 61 retaining the hub against axial movement on the shaft. The inner shaft 60 is provided at its medial portion with a diametral drive pin 65 which may be press fit therein. The pin 65 extends radially through a pair of circumferential slots 66 diametrally disposed in the outer shaft 40 in axial registry with the pin 65.

A brake member 70 comprising a cylinder having an upper braking surface 71 complemental to the braking surface 36 in the support sleeve 30 is mounted about the outside of the outer shaft 40 for rotation therewith by a pair of diametrally opposed radial pins 72 which are press fit in the brake member 70 and extend inwardly to engage a pair of diametrally disposed axial slots 74 in the outer shaft 40 but which do not engage the inner shaft 60. The braking member is thus free to move axially on the outer shaft 40 while being maintained in rotation therewith by the pins 72, the slots 74 being of sufficient length to permit the braking surfaces 36 and 71 to engage. The lower end of the brake member 70 is supported by the ends of the diametral pin 65 and is provided with a cammed lower surface including a pair of diametrally disposed ramps or cam elements 75 which are disposed to engage the ends of the pin 65 extending through the slot 66 in the outer shaft 40. The cam elements 75 are so located on the braking member 70 so that when the pin 65 is at one end of the circumferential slot 66, the braking member is in a downward position disengaging the braking surfaces 36 and 71 from contact and when the pin 65 moves toward the other end of the slot 66, which it preferably does not contact, it will operate against the cam elements 75 and move the brake member 70 axially upward to engage the braking surfaces 36 and 71. Assuming the rotation of the input sheave 21 in a clockwise direction, as viewed from the top, which would rotate the inner shaft 60 in the direction of the arrow "A" on FIG. 2 the ramp of the cam element 75 would move downwardly from left to right as shown.

In the operation of the mower 10, the spindle assembly 20 always rotates in one direction, for example the direction A indicated on the drawings. When power is supplied to the input sheave 21, as by tightening the belt 22, connecting it with an associated source of power, the input sheave 21 and the inner shaft 60 begin to rotate in the A direction or clockwise as viewed from the top. The drive pin 65 moves with the inner shaft 60 in the slot 66 of the outer shaft 40 until it contacts the clockwise or left (as viewed in FIG. 2) end of the slot 66, thereby providing a driving connection between the inner shaft 60 and the outer shaft 40. The outer shaft 40 then rotates, also in the clockwise direction, rotating the cutting blade 24. As may be seen in FIG. 2, the brake member 70 is resting on the pin 65 and is in its lowest position thereby disengaging the braking surfaces 36 and 71 from contact. At the same time the coil spring 50 is tightened in torsion by the relative rotation between the inner shaft 60 and the outer shaft 40.

Upon interruption or cessation of the driving force to the input sheave 21, the sheave 21 and the inner shaft 60 will tend to slow down due to friction, windage, and the friction of the loose belt 22 on the sheave. Since the cutting blade 24 has a relatively high inertia compared to the input sheave and inner shaft, it will then overrun the input sheave and drive the outer shaft 40 at a faster speed than the inner shaft 60, thereby producing a reverse relative rotation therebetween thus moving the pin 65 toward the counterclockwise or right end of the slot 66. The movement of the pin 65 in the slot 66 forces the pin 65 to act against the cam element 75 on the brake member 70 thereby forcing the braking member 70 upward against the support sleeve 30, engaging the braking surfaces 36 and 71. Both shafts again rotate at the same speed and the braking surfaces 36 and 71 are primarily maintained in engagement until the unit stops by the large difference in momentum of the mower blade relative to the input sheave 21.

The helical torsion spring 50 serves two functions, both primarily intended for use in the event that the belt 22 breaks, is thrown off of the sheave 21, or otherwise provides no friction on the sheave when declutched. In this case, the spring, which has been tightened in torsion by the relative rotation of the inner shaft 60 and the outer shaft 40 during start up of the mechanism, causes reverse relative rotation when the drive to the input sheave 21 is interrupted. This reverse relative rotation is sufficient to engage the braking surfaces and start the braking process as described above. Braking then is primarily caused by the differences in angular momentum between the input sheave 21 and mower blade 24, the blade 24 having a considerably higher inertia than the sheave. When the spindle assembly reaches low speed, the difference in momentum may not be sufficient to maintain the braking surfaces in contact. The resistance of the coil spring, however, is sufficient to keep the pin toward the right side of the slot 66 and keep the braking surfaces engaged.

It is noted that the braking member is not selfenergizing and the amount of braking applied depends primarily on the difference in momentum between the upper and lower pulley. Thus, the amount of time required to stop the unit can be varied by varying the inertial mass input sheave 21. Of course, it could also be changed by varying the angle or area of the braking surfaces. Moreover, because the brake is not self-energizing the braking torque does not cause undesirable peak loads on the outer shaft 40 which could cause a torsional failure of the shaft.

It is further noted that because the brake member is not self-energizing, it will not have as great a tendency to stick in the brake engaged position. Also, because the brake acts upwardly rather than downwardly, the force of gravity on the brake member also helps to free up the brake surfaces after braking although the coil spring may maintain them in contact until driving is resumed.

Thus it is apparent that there has been provided in accordance with the invention a rotary mower spindle which fully meets the objects and advantages set forth above. Those of ordinary skill in the art will readily recognize modifications of the embodiment described which may be made in view of the foregoing specification. Accordingly it is intended to embrace all such modifications as may fall within the scope of the appended claims.

What is claimed is:

1. In a rotary mower having a housing, a vertical spindle assembly mounted on said housing, a power input member mounted at the upper end of said spindle assembly and adapted to be rotatably driven from an associated source of power, and a rotary impact cutting blade mounted to the lower end of said spindle assembly for high speed rotation, the improvement wherein said spindle assembly comprises a support sleeve having a first braking surface, a hollow outer shaft journalled in said sleeve and having a circumferential slot, an inner shaft mounted for rotation within said outer shaft, a radially extending drive pin fixed in said inner shaft in registry with said circumferential slot and extending therethrough, a brake member having a second braking surface mounted on the outside of said outer shaft for rotation therewith, said braking member being axially movable on said outer shaft to engage said first and second braking surfaces, said braking member further having a cammed surface disposed for engagement with said drive pin, the configuration of said cammed surface relative to said pin being such that upon said source of power being interrupted and said cutting blade overrunning said input member, said drive pin axially shifts said brake member on said outer shaft to a position engaging said braking surfaces.

2. The invention in accordance with claim 1 and said support sleeve comprising a cavity, the top side of said cavity comprising said first braking surface, the top side of said brake member comprising said second braking surface.

3. The invention in accordance with claim 2 and the lower surface of said brake member comprising said cammed surface, said drive pin supporting said brake member.

4. The invention in accordance with claim 3 and said outer shaft having a second circumferential slot diametrally disposed from said circumferential slot, said drive pin extending diametrally through said inner shaft and said second slot, said cammed surface comprising a pair of diametrally disposed cam elements.

5. The invention in accordance with claim 4 and said outer shaft having an axial slot, said brake member having a pin extending within said slot, said pin being out of contact with said inner shaft.

6. The invention in accordance with claim 1 and a helical torsion spring disposed within said outer shaft, one end of said spring being connected to said outer shaft, the other end of said spring being connected to said inner shaft, said spring being loaded in torsion by relative rotation of said outer and inner shafts upon drive being transmitted to said input member.

7. In a rotary mower having a housing, a spindle means mounted on said housing, an input sheave mounted on said spindle means and adapted to be belt driven from an associated drive source, and a high speed rotary cutting blade of an inertia considerably larger than said input sheave mounted to said spindle means, the improvment wherein said spindle means comprises a nonrotatable supporting sleeve having an internal cavity, the upper boundary of said cavity comprising a first braking surface, an outer shaft journalled in said sleeve and having a plurality of circumferential slots, the lower end of said outer shaft being positively connected to said cutting blade, an inner shaft mounted for limited rotation within said outer shaft, said input sheave being mounted on said inner shaft, radially extending pin means affixed in said inner shaft and extending through said circumferential slots, a brake member having an upper surface including a second braking surface adapted to complementally engage said first braking surface axially movably mounted on the outside of said outer shaft above said pin means for rotation therewith, said brake member further comprising a lower surface including a plurality of cam surfaces in register with said circumferential slots, said cam surfaces being disposed for engagement with said pin means such that, upon cessation of drive to said input sheave and said blade overrunning said input sheave due to its inertia of rotation, said pin means moves in said slots against said cam surfaces to shift said braking surfaces into engagement, said braking surfaces being noncontacting when power is supplied to said input sheave.

8. The invention in accordance with claim 7 and torsion spring means having a first end connected to said outer shaft and a second end connected to said inner shaft for inducing reverse rotation therebetween upon cessation of power to said input sheave.

9. The invention in accordance with claim 8 and said torsion spring means comprising a helical torsion spring disposed within said outer shaft beneath said inner shaft.

10. The invention in accordance with claim 7 and said pin means comprising a diametral pin, said plurality of said circumferential slots comprising a pair of diametrally disposed slots.

11. The invention in accordance with claim 7 and said support sleeve comprising substantially identical upper and lower sections to permit the manual interchange thereof relative to the outer shaft to provide a replacement first braking surface.

12. The invention in accordance with claim 7 and seal means disposed between said support sleeve and said outer shaft on both sides of said internal cavity in said support sleeve.

* * * * *